No. 682,688. Patented Sept. 17, 1901.
T. J. HART.
VALVE.
(Application filed May 3, 1897.)
(No Model.)

Witnesses:
F. F. Schwinger
E. A. Volk

Thos. J. Hart, Inventor
By Wilhelm & Bonner
Attorneys.

UNITED STATES PATENT OFFICE.

THOMAS J. HART, OF BUFFALO, NEW YORK, ASSIGNOR TO SHERWOOD MANUFACTURING COMPANY, OF SAME PLACE.

VALVE.

SPECIFICATION forming part of Letters Patent No. 682,688, dated September 17, 1901.

Application filed May 3, 1897. Serial No. 634,866. (No model.)

*To all whom it may concern:*

Be it known that I, THOMAS J. HART, a citizen of the United States, residing at Buffalo, in the county of Erie and State of New York, have invented a new and useful Improvement in Valves, of which the following is a specification.

This invention relates to valves which are particularly designed for controlling carbonic-acid gas or other gases confined under high pressure, and has for its object to produce a valve for this purpose which is simple and inexpensive in construction and which will effectually prevent the gas from leaking.

Figure 1:
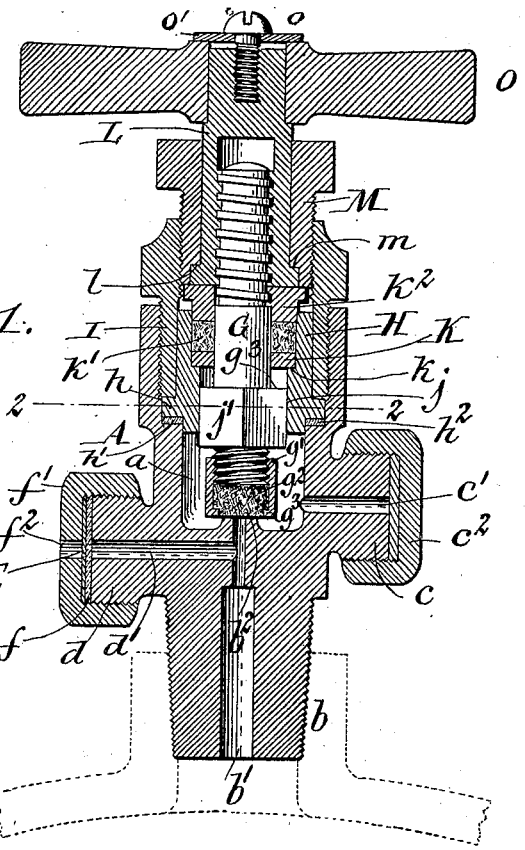
Figure 2:
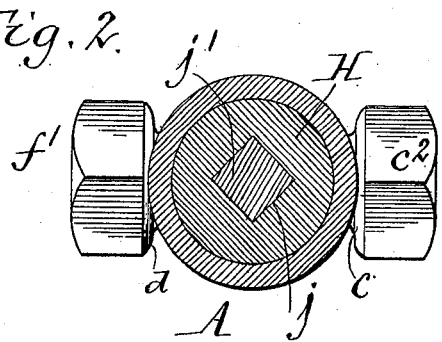

In the accompanying drawings, Figure 1 is a longitudinal section of my improved valve. Fig. 2 is a cross-section in line 2 2, Fig. 1.

Like letters of reference refer to like parts in both figures.

A represents the valve-body, which is provided with a valve-chamber $a$, an air-inlet nipple $b$, which is attached to the gas-reservoir and provided with an inlet-passage $b'$, extending from its outer end into the valve-chamber, an outlet-nipple $c$, projecting laterally from one side of the valve-chamber and provided with a passage $c'$, extending from its outer end into the valve-chamber, and a safety-nipple $d$, projecting laterally from the inlet-nipple and provided with a passage $d'$, extending from its outer end into the inlet-passage $b'$. The valve-chamber is provided with a valve-seat $b^2$ around the inner end of the inlet-passage, against which the valve bears and closes the passage $b'$ while storing and transporting the reservoir. The outlet-nipple is provided with an external screw-thread, which permits of coupling the same with the apparatus to which the gas is to be conducted, and in order to prevent this thread from being injured while handling the gas-reservoir and also to prevent the gas from escaping if the valve should be accidentally opened the outlet-nipple is closed by an internally-screw-threaded cap $c^3$ applied thereto.

E represents a frangible disk or diaphragm which closes the passage in the safety-nipple and which is adapted to be fractured by the pressure of the gas in the reservoir when the same exceeds a predetermined limit, thereby preventing bursting of the reservoir. This disk is pressed against a lead washer or packing-ring $f$ on the outer end of the safety-nipple by means of an internally-screw-threaded cap $f'$, which engages with the externally-threaded safety-nipple and which is provided on the outer side of the disk with a gas-escape opening $f^2$ in line with the passage in the safety-nipple.

G represents the valve-stem, which is arranged lengthwise in the upper portion of the valve-chamber axially in line with the inlet-passage and which is provided on its lower portion with an external screw-thread.

$g$ is the valve arranged on the lower end of the valve-stem and adapted to bear against the annular valve-seat which surrounds the inner end of the inlet-passage. This valve consists of a circular block of rubber or other packing material and is secured to the valve-stem by means of a clamping-sleeve $g'$, which surrounds the valve and which is provided at its upper end with an internal screw-thread engaging with the screw-threaded lower end of the valve-stem and provided at its lower end with an internal annular flange $g^2$, which bears against an annular shoulder on the lower marginal portion of the valve. Upon screwing the clamping-sleeve upwardly on the valve-stem the valve is firmly clamped against the lower end of the valve-stem.

H represents a guide-sleeve in which the valve-stem and its packing are guided. This sleeve is arranged in the upper portion of the valve-chamber around the central portion of the stem and is provided on its outer side with an annular flange $h$, which rests on an annular shoulder $h'$, formed on the adjacent portion of the valve-body. A washer or packing-ring $h^2$, of lead or similar material, is preferably interposed between the body-shoulder $h'$ and the guide-sleeve flange $h$, so as to form a gas-tight joint between these parts when they are pressed together.

I represents a clamping-sleeve which surrounds the guide-sleeve and bears with its lower end against the flange of the guide-sleeve. The lower portion of the clamping-sleeve is provided with an external screw-thread which engages with the internally-screw-threaded upper portion of the body. Upon screwing the clamping-sleeve downwardly until it bears firmly against the guide-sleeve flange the latter is pressed tightly against the shoulder of the body and prevents leakage at this point. The inner side of the lower portion of the guide-sleeve is provided with a square or flat-sided portion $j$, and the valve is provided with a correspondingly-shaped portion $j'$, which fits into the flat-sided portion of the guide-sleeve, thereby preventing the valve and its stem from turning.

K represents a lower supporting ring or follower which surrounds the valve-stem above its flat-sided portion and which normally rests with its marginal portion on an internal shoulder $k$, formed on the central portion of the guide-sleeve.

$k'$ is a packing-ring, of rubber or other elastic material, surrounding the valve-stem above the lower supporting-disk and bearing against the top of the latter. $k^2$ is an upper gland or follower which surrounds the valve-stem above the packing-ring and bears upon the latter. Upon pressing these two followers together the elastic packing-ring between the same is compacted and spread out, so that it bears snugly against the valve-stem and the inner side of the guide-sleeve, thereby preventing any gas from leaking past the stem.

L represents a hollow rotary valve-spindle whereby the valve is opened and closed and which is provided on its lower portion with an internal screw-thread which receives the externally-threaded upper portion of the valve-stem. This spindle bears with its lower end against the upper side of the upper follower and is provided at its lower end with an external annular shoulder $l$. The valve-spindle is prevented from moving upward by a thrust-sleeve M, which surrounds the valve-spindle and is provided with an external screw-thread which engages with an internal thread on the upper portion of the clamping-sleeve I. The lower end of the thrust-sleeve bears against the upper side of the upper follower and is provided with an internal annular shoulder $m$, which bears against the shoulder of the spindle.

O represents the handle or cross-bar, whereby the valve-spindle is turned, and which is detachably connected with the latter in any suitable way, preferably by a screw $o$ and a washer $o'$, as shown. Upon turning the spindle its screw connection with the stem causes the latter, together with the valve, to be raised or lowered and carried from or toward the valve-seat.

When the valve is closed, the pressure of the gas against the same is transmitted successively to the valve-stem, valve-spindle, thrust-sleeve, and clamping-sleeve to the body. Upon opening the valve to its fullest extent the shoulder $g^3$, formed on the valve-stem above its flattened portion, bears firmly against the under side of the lower follower and the valve-spindle bears against the upper side of the upper follower, whereby these followers are pressed toward each other and the packing between the same is pressed against the stem and the guide-sleeve, thereby effectually preventing any gas from passing the valve-stem packing and reaching the screw-thread connection between the valve-stem and spindle, which screw-thread connection would otherwise soon be rusted or corroded by the gas and the valve would be rendered difficult to open and close.

I claim as my invention—

1. The combination with the valve-body having a valve-seat and inlet and outlet passages, of a longitudinally-movable valve-stem arranged in a guide and provided with a valve and with an upwardly-facing shoulder, a follower surrounding the valve-stem above its shoulder and resting on a shoulder on said guide, a packing-ring resting on the follower and bearing against said stem and guide, and a rotary valve-spindle having a screw connection with said stem, whereby upon opening the valve fully the packing is compressed from below by the upward movement of the valve-stem, substantially as set forth.

2. The combination with a valve-body having a valve-seat and inlet and outlet passages, of a longitudinally-movable valve-stem arranged in a guide and provided with a valve and with a shoulder, a lower follower surrounding the valve-stem above its shoulder and resting on a shoulder on said guide, a packing-ring resting on the lower follower and surrounding the valve-stem, an upper follower resting on the packing and surrounding the valve-stem, and a rotary valve-spindle having a screw connection with the valve-stem and bearing against the upper follower, substantially as set forth.

3. The combination with the valve-body having a valve-seat and inlet and outlet passages, of a guide-sleeve provided with an external flange bearing against a shoulder on the body, a clamping-sleeve having a screw connection with the body and bearing against said flange, a longitudinally-movable valve-stem guided in the guide-sleeve and provided with a valve and with a shoulder, a lower follower surrounding the valve-stem above its shoulder and resting on an internal shoulder on the guide-sleeve, a packing surrounding the valve-stem and resting on the lower follower, an upper follower surrounding the valve-stem and resting on the packing, and a rotary valve-spindle having a screw connection with the valve-stem and bearing against the upper side of the upper follower, substantially as set forth.

4. The combination with the valve-body having a valve-seat and inlet and outlet passages, of a guide-sleeve provided with an external flange bearing against a shoulder on the body, a clamping-sleeve having a screw connection with the body and bearing against said flange, a longitudinally-movable valve-stem guided in the guide-sleeve and provided with a valve and with a shoulder, a lower follower surrounding the valve-stem above its shoulder and resting on an internal shoulder on the guide-sleeve, a packing surrounding the valve-stem and resting on the lower follower, an upper follower surrounding the valve-stem and resting on the packing, a rotary valve-spindle having a screw connection with the valve-stem and bearing against the upper side of the upper follower, and a thrust-sleeve bearing against the upper follower and having a shoulder bearing against a shoulder on the valve-spindle and a screw connection with said clamping-sleeve, substantially as set forth.

Witness my hand this 29th day of December, 1896.

THOMAS J. HART.

Witnesses:
 THEO. L. POPP,
 JNO. J. BONNER.